Feb. 19, 1957 S. SHARIN 2,782,344

BINARY RECIPROCONDUCTIVE CIRCUIT

Filed March 23, 1954

INVENTOR.

SAMUEL SHARIN

BY Charles H. Brown

ATTORNEY

United States Patent Office 2,782,344

Patented Feb. 19, 1957

2,782,344

BINARY RECIPROCONDUCTIVE CIRCUIT

Samuel Sharin, Brooklyn, N. Y., assignor to Radio Corporation of America, a corporation of Delaware Application March 23, 1954, Serial No. 418,039

14 Claims. (Cl. 315—201)

The invention relates to reciproconductive circuits and particularly pertains to binary reciproconductive circuits frequently used in electronic counting chains, frequency dividers and the like.

As employed herein, the term "reciproconductive circuit" is construed to include all dual-electrode or glow-discharge device circuits in which conduction alternates between one or the other electron discharge device in response to applied triggering potential. The circuit arrangements of the invention are concerned primarily with the "binary" reciproconductive circuit which has a single input terminal and in which the state of conduction is reversed as each trigger pulse is applied, although it will be shown how the circuit according to the invention may be modified to form a "lockover" reciproconductive circuit, which is one in which there are two input terminals and trigger pulses are required at alternate inputs in order to reverse the state of conduction.

Known reciproconductive circuits generally employ vacuum tubes or grid-controlled gaseous discharge devices to establish the reciprocal conditions of conduction. Both of these devices require a filament heating power supply, which means that in addition to the bulk of the conventional vacuum or grid-controlled gaseous discharge tubes, a large amount of energy is lost and a correspondingly large amount of heat is generated. In attempting to avoid the adverse effects of the presence of the filament power supply and the heat generated thereby additional bulk and attendant weight are involved.

In some applications, visual indication of the action occurring, or the status of condition, is required. In the usual practice, glow-discharge devices are coupled to the reciproconductive circuits to provide this visual indication.

It has been suggested that glow-discharge devices be used to form reciproconductive circuits. Attempts have been made to accomplish this objective, but so far as the applicant is aware, no one has been able to produce a reciproconductive circuit using dual-electrode glow-discharge devices to form either a binary or a lockover reciproconductive circuit, and furthermore no one has been able to produce a reciproconductive circuit using glow-discharge devices which can be used to drive another similar reiproconductive circuit.

An object of the invention is to provide a binary reciproconductive circuit which will also indicate the condition in which the circuit is stable without requiring separate physical components for each function.

Another object of the invention is to provide a binary reciproconductive circuit using glow-discharge devices which can be used to drive another similar reciproconductive circuit using glow-discharge devices.

A still further object of the invention is to provide an electronic reciproconductive circuit occupying a smaller volume than is possible with the prior art arrangements.

A more specific object of the invention is to provide an improved and simplified electronic binary reciproconductive circuit using dual-electrode glow-discharge devices.

A further specific object of the invention is to provide an improved arrangement of series connected binary reciproconductive circuits which does not require any filament heating power supply.

These and other objects of the invention are obtained in a reciproconductive circuit comprising two series subcircuits each having a dual-electrode glow-discharge device, a resistive element having one terminal connected to a given electrode of the glow-discharge device and a unidirectional current conducting device having one terminal connected to the other electrode of the glow-discharge device, and a capacitor intercoupling the two sub-circuits by interconnecting the given electrodes. A source of operating potential is connected across both of the subcircuits and poled so that current can be made to flow through the unidirectional current conducting devices when the dual-electrode glow-discharge device associated therewith is conducting. Output pulses are obtained between either or both of the given electrodes of the glow-discharge devices and the terminal of the unidirectional current conducting devices remote from the electrodes of the glow-discharge devices. The lockover reciproconductive circuit is obtained by providing input terminals individual to the sub-circuits. Series capacitor input across the unidirectional current conducting device serves to apply triggering potential to each sub-circuit. If necessary, isolating resistors can be connected in series with the input capacitor in order to reduce the loading on the source of the input pulses. Binary reciproconductive circuits are obtained by connecting a pair of input coupling capacitors in series between the other electrodes of the two dual-electrode discharge devices. Input pulses are applied between the junction of the two coupling capacitors and the terminals of the unidirectional current conducting devices remote from the electrodes. Each time triggering potential is applied to the binary input terminals, the glow-discharge device which is conducting is then extinguished and the other glow-discharge device is made to conduct.

In order that the invention may be more clearly understood and readily put to practical use, several circuit arrangements embodying the invention are hereinafter described, by way of examples only, with reference to the accompanying drawing in which.

Figure 1:
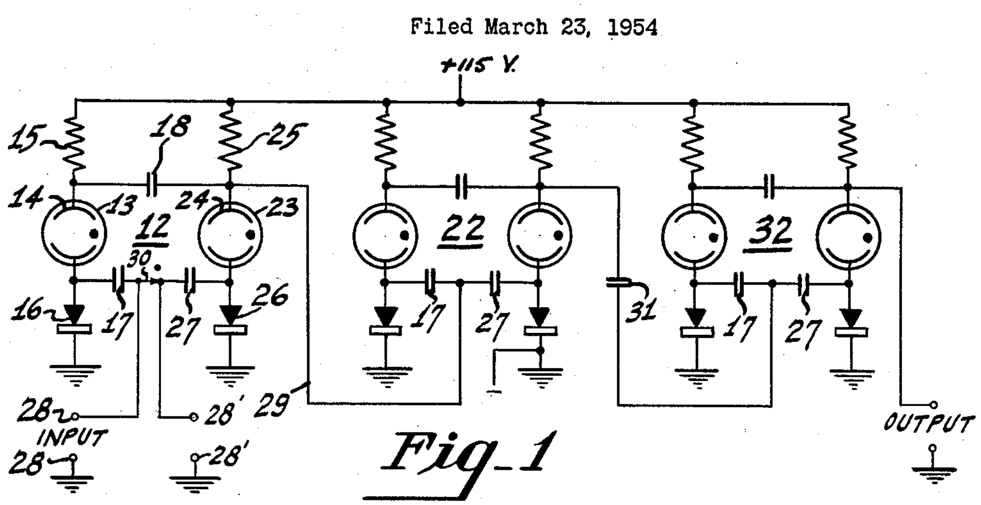
Fig. 1 is a schematic diagram of a binary counting chain or frequency divider using reciproconductive circuits according to the invention.

Referring to Fig. 1, there is shown a reciproconductive circuit 12 according to the invention which comprises a pair of dual-electrode glow-discharge devices 13 and 23. Resistance elements 15 and 25 are connected between a point of positive potential and given like electrodes 14, 24 of the dual-electrode glow-discharge devices 13 and 23. The other electrode of each of the glow-discharge devices is connected through unilateral current conducting devices, shown here in the form of semi-conductor diode elements 16 and 26, to a point of neutral or fixed R. F. reference potential such as ground. Capacitors 17 and 27 are employed to couple input pulse energy across the diode elements 16 and 26 respectively to trigger the sub-circuits as desired. A capacitor 18 intercouples the given like electrodes 14, 24. The circuit arrangement as thus far described may be used as a lockover reciproconductive circuit by isolating the two input capacitors 17, 27 by opening the switching element 30 for connection to separate input trigger sources at terminals 28, 28 and 28', 28'. A binary reciproconductive circuit is obtained with the two input coupling capacitors 17 and 27 connected in series as shown with input terminals 28, 28 connected to the junction between the two input coupling capacitors 17, 27 and the point of fixed reference potential. Output is obtained from either or both of the electrodes 14, 24 of the glow-discharge devices remote from the input circuits in a manner conventional to reciproconductive circuits in general.

The operation of the binary reciproconductive circuit will be explained on the assumption that similar glow-discharge devices having a striking voltage characteristic of 135±15 volts and a maintaining voltage of 75±10 volts are used and that initially one glow-discharge device 13 is non-conducting while the other device 23 is conducting. The electrode 14 is then at positive 115 volts potential and the electrode 24 is at positive 75 volts D. C. The first input pulse, which must be negative 20 volts or more, applied across the terminals 28, 28 causes the potential across the one glow-discharge device 13 to increase to the striking potential. The one glow-discharge device will strike bringing the electrode 14 down to 75 volts. This 40 volt negative transition is passed by way of the coupling capacitor 18 to the electrode 24 of the other glow-discharge device, extinguishing this device and allowing the electrode 24 to rise to 115 volts. The second pulse across the input terminals 28, 28 triggers the circuit so that the electrode 14 again rises to 115 volts and the electrode 24 drops back to 75 volts as in the initial state of conduction of the glow-discharge devices 13, 23.

It is an advantage of the reciproconductive circuit according to the invention that one stage may be used to drive another. As shown in Fig. 1, a direct connection 29 from the electrode 24 of the reciproconductive circuit 12 is connected to the input capacitors 17 and 27 of a similar reciproconductive circuit 22. It is perhaps more convenient from the design viewpoint to connect one stage with another by means of a capacitor 31 as shown interconnecting the reciproconductive circuit 22 with the reciproconductive circuit 32. The circuit arrangement shown in Fig. 1 may be used as a frequency divider or a counting chain in the conventional manner.

The operation of the individual stages 12, 22 and 32 is exactly the same as described above. When the reciproconductive circuits are intercoupled the 40 volt positive transition occurring at the electrodes 24 is coupled to the succeeding stage and bypassed by the forward conduction of the unilateral current conducting devices or diode elements 16, 26. The negative transitions at the electrodes 24 will trigger the succeeding stage to the reciprocal condition of conduction. Since only every other pulse at the output electrodes 24 is negative, the succeeding stage is triggered only half as often as the preceding stage, effecting a division- or count-by-two. By proper feedback connections between stages counting can be performed on other than a binary basis, as is known in the art.

Figure 2:
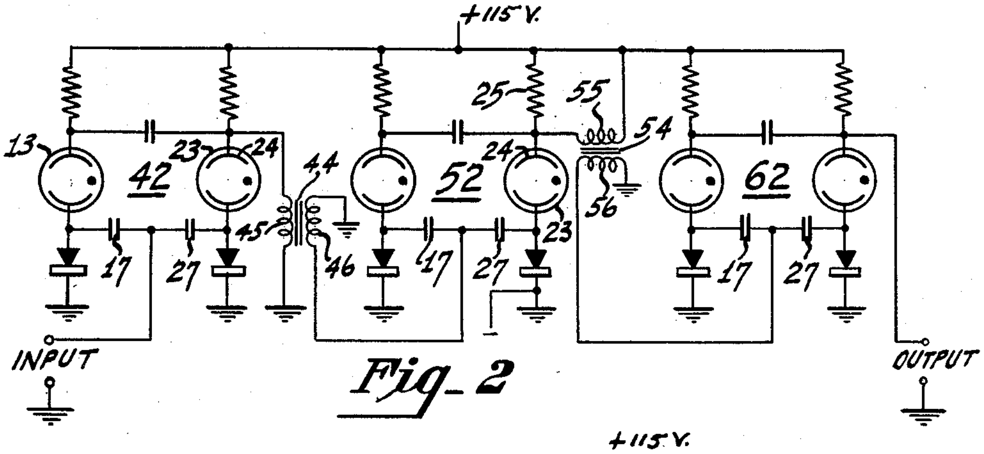
Fig. 2 is a schematic diagram of another binary counting chain or frequency divider using reciproconductive circuits according to the invention.

Reciproconductive circuits constructed according to the schematic diagram shown in Fig. 1 have been connected in cascade and successfully operated with one reciproconductive stage driving a further reciproconductive stage. With some types of dual-electrode glow-discharge devices, however, it is difficult to derive output pulses which will readily trigger the succeeding reciproconductive stage. In such an instance it is suggested that the output pulse be amplified by means of a stepup transformer 44 as shown in Fig. 2. The transformer 44 has a primary winding 45 which is connected to the given electrode 24 of the glow-discharge device 23 of the reciproconductive circuit stage 42 and the point of fixed reference potential. A secondary winding 46 on transformer 44 is connected between the point of fixed reference potential and the junction between the input coupling capacitors 17, 27 of the following stage 52. An alternate arrangement is shown intercoupling the reciproconductive stage 52 with the final stage 62 wherein a transformer 54 has a secondary winding 56 connected in the same manner as the secondary winding 46 of the previous circuit, but the primary winding 55 is connected between the given electrode 24 and the point of positive direct potential. In some cases the winding 55 may be used as the resistive component of the series sub-circuit of the stage 52 so that the resistance element 25 may be eliminated.

Figure 3:
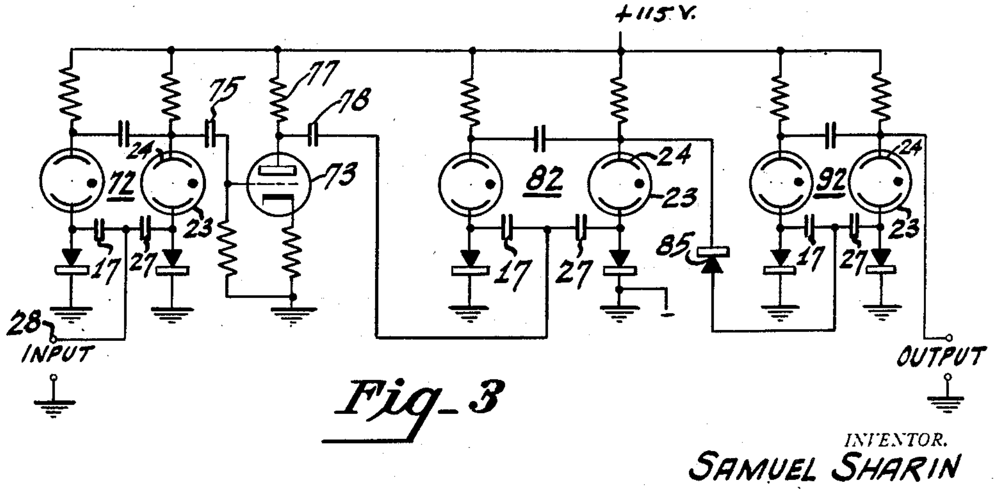
Fig. 3 is a schematic diagram of another circuit chain comprising a plurality of reciproconductive circuits according to the invention.

In Fig. 3, there is shown a circuit comprising reciproconductive circuits according to the invention which are intercoupled by unilateral impedance devices. The reciproconductive circuit 72 is coupled to the succeeding circuit 82 by means of a controlled electron flow path device in the form of a vacuum tube 73 having an input circuit coupled to the given electrode 24 of the glow-discharge device 23 by means of a coupling capacitor 75. Pulse output from the stage 72 is amplified and developed across a load resistor 77 from which it is coupled by means of a coupling capacitor 78 to the input of the succeeding reciproconductive circuit stage 82. In addition to amplification, this circuit arrangement has the advantage that stray fluctuations in the stage 82 will not be passed back to the stage 72, obviating any possible adverse effects thereon. The use of a heated filament vacuum tube, of course, is a disadvantage as previously explained, although only one electron discharge system is required for each reciproconductive circuit stage, which is still a saving in weight, bulk and power consumed. Those familiar with the similarities and the differences between vacuum tubes and transistors will appreciate the fact that the latter form of controlled electron flow path device may be connected in the proper circuitry to realize the results obtainable with the former without departing from the spirit and scope of the invention. Where amplification is not necessary, isolation may be achieved by means of a unilateral current conducting device shown in Fig. 3 as a diode element 85 connected between the given electrode 24 of the glow-discharge device 23 in the reciproconductive circuit 82 and the input terminals of the succeeding reciproconductive circuit stage 92.

While different means for intercoupling successive reciproconductive circuits are shown in each of the three figures, it should be understood that the same means is preferably used between all stages of a single piece of apparatus, although even other combinations of the components shown and obvious equivalents thereof may be used, depending upon the circumtsances for which the apparatus is designed. This is particularly so where D. C. loading of the circuits must be avoided.

A typical reciproconductive circuit constructed along the lines of the stage 12 was successfully operated with the following values for the component parts.

| Ref. No. | Part | Type or Value |
|---|---|---|
| 13, 23 | Neon Lamp | RCA 991. |
| 18 | Capacitor | 0.1 mfd. |
| 15, 25 | Resistor | 51 Kilohms. |
| 16, 26 | Germanium diode | IN34A. |
| 17, 27 | Capacitor | 0.02 mfd. |

The anode potential was 68 volts D. C.

The following component values were used in a successfully operated binary reciproconductive circuit divider having three stages of the same structure as the stages 22 and 32.

| Ref. No. | Part | Value or Type |
|---|---|---|
| 13, 23 | Neon Lamp | NE 96. |
| 15, 25 | Resistor | 100 Kilohms. |
| 16, 26 | Germanium diode | 1N97. |
| 17, 27 | Capacitor | 500 mmfd. |
| 18 | do | 2,200 mmfd. |
| 31 | do | 5,000 mmfd. |

The anode potential supply delivered 115 volts D. C. Obviously, those skilled in the art will use other values to suit the circumstances at hand.

The invention claimed is:

1. A binary reciproconductive circuit including a pair of series circuits each comprising a resistance element, a dual-electrode glow-discharge device having a first electrode connected to said resistance element, and a unidirectional current conducting device having one terminal connected to a second electrode of said glow-discharge device; means to apply direct potential across both of said series circuits, a capacitive element connected between the first electrodes of said pair of glow-discharge devices, a pair of capacitive components connected in series between the second electrodes of said pair of glow-discharge devices, means to apply an input pulse between the junction of said pair of capacitive components and the terminals of said unidirectional devices remote from said electrodes, and means to derive an output pulse between one of said first electrodes and the terminals of said unidirectional devices remote from said electrodes.

2. A binary reciproconductive circuit chain including a plurality of series circuits each comprising a resistance element, a dual-electrode glow-discharge device having a first electrode connected to said resistance element, and a unidirectional current conducting device having one terminal connected to a second electrode of said glow-discharge device; means to apply direct potential across all of said series circuits, a capacitive element connected between the first electrodes of the glow-discharge devices in each pair of said series circuits, a pair of capacitive components connected in series between the second electrodes of said glow-discharge devices in each pair of series circuits, connections between one of the first electrodes of each pair of glow-discharge devices and the junction of said pair of capacitive components of the next succeeding pair of glow-discharge devices, means to apply an input pulse between the junction of said pair of capacitive components of the first pair and the terminals of said unidirectional devices remote from said electrodes, and means to derive an output pulse between one of said first electrodes of the last pair and the terminals of said unidirectional devices remote from said electrodes.

3. A binary reciproconductive circuit chain including at least two pairs of series circuits each comprising a resistance element, a dual-electrode glow-discharge device having a first electrode connected to said resistance element, and a unidirectional current conducting device having one terminal connected to a second electrode of said glow-discharge device and another terminal connected to a point of fixed reference potential; means to apply direct potential across all of said series circuits, a capacitive element connected between the first electrodes of the glow-discharge devices in each pair of said series circuits to form reciproconductive circuit stages, a pair of capacitive components connected in series between the second electrodes of said glow-discharge devices in each stage, means to apply input pulses between the junction of said pair of capacitive components of one stage and said point of reference potential, interstage coupling means connected between one of the first electrodes of one stage and the junction of said pair of capacitive components of another stage, and means to derive output pulses between one of said first electrodes of the last stage and said point of reference potential.

4. A binary reciproconductive circuit chain as defined in claim 3, wherein said interstage coupling means is constituted by a connection capable of passing direct current.

5. A binary reciproconductive circuit chain as defined in claim 3, wherein said interstage coupling means is constituted by a capacitive element.

6. A binary reciproconductive circuit chain as defined in claim 3, wherein said interstage coupling means is constituted by a transformer.

7. A binary reciproconductive circuit chain as defined in claim 6, wherein said transformer comprises a primary winding connected between said one first electrode of the one stage and said point of reference potential and a secondary winding connected between the junction of the pair of capacitive components of the other stage and said point of reference potential.

8. A binary reciproconductive circuit chain as defined in claim 6, wherein said transformer comprises a primary winding connected between said one first electrode of the one stage and the positive pole of said direct potential and a secondary winding connected between the junction of the pair of capacitive components of the other stage and said point of reference potential.

9. A binary reciproconductive circuit chain as defined in claim 3, wherein said interstage coupling means is constituted by a controlled electron flow path device having an input circuit coupled across a glow discharge device of the one stage and an output circuit coupled between the junction of the pair of capacitive components of the other stage and said point of reference potential.

10. A binary reciproconductive circuit chain as defined in claim 9, wherein said controlled electron flow path device is constituted by an electron discharge device.

11. A binary reciproconductive circuit chain as defined in claim 9, wherein said controlled electron flow path device is constituted by a unilateral current conducting device.

12. A binary reciproconductive circuit comprising two dual-electrode glow-discharge devices, a capacitor coupling a single electrode of each device to the other, resistors individually connected to said single electrodes, diode elements individually connecting the other electrodes of said glow-discharge devices to a point of neutral fixed reference potential, means to apply direct operating potential between the terminals of said resistors remote from said electrodes and said point of fixed reference potential, means including a pair of capacitors for applying pulse input between said other electrodes of said glow-discharge structures and said point of neutral fixed reference potential, and means coupled between one of said single electrodes and said point of fixed reference potential to derive an output pulse.

13. A chain of binary reciproconductive circuit stages, each stage comprising two dual-electrode glow-discharge devices, a capacitor coupling a single electrode of each device to the other, resistors individually connected to said single electrodes, diode elements individually connecting the other electrodes of said glow-discharge devices to a point of neutral fixed reference potential, means to apply direct operating potential between the terminals of said resistors remote from said electrodes and said point of fixed reference potential, and a pair of capacitors connected in series between said other electrodes of said glow discharge devices; and an interstage coupling device connected between one of the single electrodes of one stage and the junction of said pair of capacitors of another stage.

14. A binary reciproconductive circuit for a counter or divider including a pair of circuits, a pair of terminals between which a source of unidirectional potential is adapted to be connected, each circuit of said pair of circuits comprising a dual-electrode glow-discharge device having a first electrode coupled to one of said pair of terminals, and a unidirectional current conducting device having one side connected to a second electrode of said glow-discharge device and its other side connected to the other of said pair of terminals; a capacitive element connected between the first electrodes of said pair of glow-discharge devices, a pair of capacitive components connected in series between the second electrodes of said pair of glow-discharge devices, means to apply an input pulse between the junction of said pair of capacitive components and said other terminal, and means to derive an output pulse between one of said first electrodes and said other terminal.

References Cited in the file of this patent

UNITED STATES PATENTS

| | | |
|---|---|---|
| 2,549,667 | Cosby | Apr. 17, 1951 |
| 2,549,779 | Crenshaw | Apr. 24, 1951 |
| 2,644,112 | Desch | June 30, 1953 |